Jan. 13, 1942. F. BEKEN Re. 22,002

MIXING MACHINE

Original Filed May 15, 1936 2 Sheets-Sheet 1

INVENTOR.

Fritz Beken.

BY

Stone, Boyden & Meech.

Attorneys.

Jan. 13, 1942. F. BEKEN Re. 22,002

MIXING MACHINE

Original Filed May 15, 1936 2 Sheets-Sheet 2

Inventor,

Fritz Beken.

By Stone, Boyden & Marks.
Attorneys

Reissued Jan. 13, 1942 Re. 22,002

UNITED STATES PATENT OFFICE 22,002

MIXING MACHINE

Fritz Beken, Ilford, England

Original No. 2,095,907, dated October 12, 1937, Serial No. 79,976, May 15, 1936. Application for reissue February 21, 1939, Serial No. 257,766. In Great Britain July 24, 1935

7 Claims. (Cl. 259—104)

Figure 1:
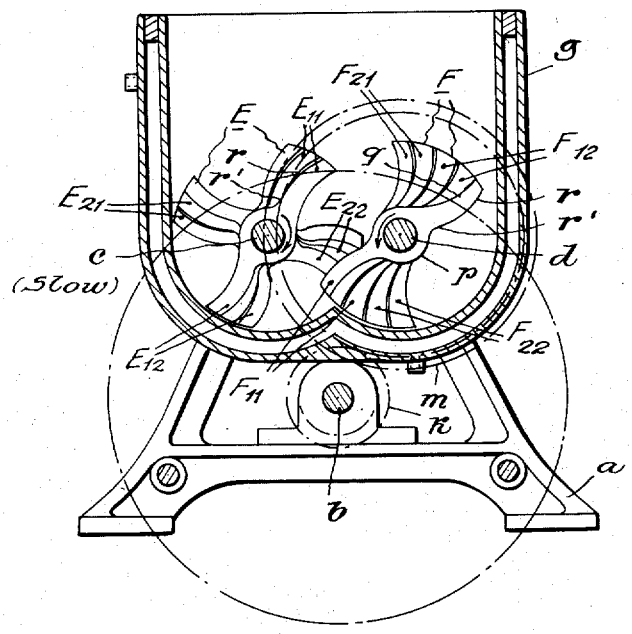

This invention relates to mixing machines, and has for its object the provision of an improved machine which will intimately mix various materials in a shorter time than has hitherto been possible, or which, if the mixing process is not materially hastened, will produce a more perfect mixture than is obtained by other machines of the type employing rotating beaters, paddles or agitators to which the present invention relates.

The improved machine hereinafter described is particularly adapted for mixing plastic materials but may be employed also for mixing granular or powdered materials or even in mixing processes in which a liquid, such as a chemical solution for example, is added to the material under treatment.

The invention is characterized by various features which will be described more fully hereinafter. Referring to the same briefly and in general, at this point, paddles on parallel shafts are caused to coact, these rotating in opposite directions at different speeds, so that blades of one paddle recurrently overtake blades of the coacting more slowly moving paddle. The angular setting of the blades on the two shafts, in relation to each other, their shapes, and relative speeds, and the spacing of the shafts, are calculated to enable desired effects to be obtained, in the squeezing and drawing out of the material between co-acting paddles, as is more fully described hereafter.

Preferably, also, a plurality of paddles are spaced axially along each of the shafts, each paddle on one shaft coacting with a paddle on the other shaft, coacting paddles being alined with each other in a plane at right angles to the axis of rotation. The blades of the paddles preferably are arranged to cause the material to move axially of the shafts, in addition to its rotating movement. This may be accomplished by setting the blades, as to their lateral dimensions, at angles to the axes of the shafts. Preferably also, with a plurality of paddles spaced along each shaft, the blades of one or more paddles on one shaft are set at an angular advance, or retardation, each in its plane of rotation, with respect to the blades of a preceding paddle on that shaft, while the blades of the coacting paddles on the other shaft have suitable angular relations, in each case, to the blades of the coacting paddle on the first shaft, enabling the same cycle of operations to take place between each coacting pair of paddles, but with a different timing as between some of the coacting pairs.

In the machine illustrated, one paddle shaft is adapted to rotate at twice the speed of the other paddle shaft.

Figure 2:
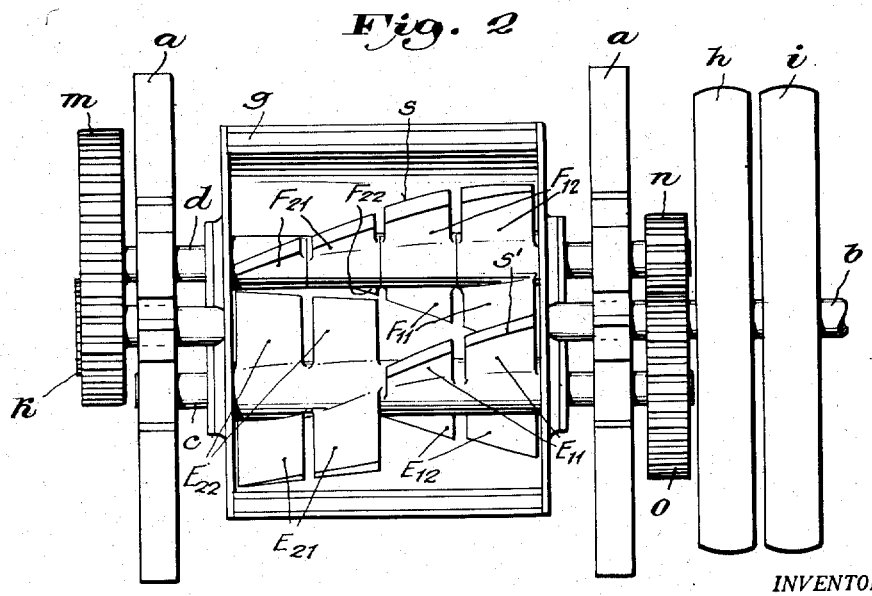

The nature of the invention will be more clearly appreciated by reference to the accompanying drawings, illustrating by way of example one form of mixing machine embodying the invention, similar reference characters referring to like parts in the figures:

Figure 1 being a sectional elevation;

Figure 2 a plan view; and

Figures 3–11, inclusive, are a series of diagrams showing relative positions of coacting paddles in the operation of the machine.

Referring to the drawings, it will be seen that on the main frames or standards *a* of the machine are mounted the main mixture driving shaft *b* and the two secondary parallel horizontal driven shafts *c* and *d* that respectively carry paddles or beaters each having two blades which are rotated in the interior of the stationary mixing casing *g* that contains the material under treatment.

With the use of a plurality of pairs of coacting paddles as shown, the angular relationship of the blades of each paddle in reference to the blades of its coacting paddle on the other shaft will be such as to produce the same cycle of operations by each pair of coacting paddles. As to the paddles mounted on the same shaft, however, there may be an angular advance or setting back of the blades of one or more paddles with respect to the blades of another paddle or paddles on the same shaft. Thus, in the construction shown in Fig. 2, the blades $E_{21}$ of two of the paddles on shaft *c* are so set that they are about at right angles to the remaining blades on the shaft. Because of the preferred spiral arrangement of the blades, which is presently to be described, it should be said, more strictly speaking, that the blades $E_{21}$ and $E_{22}$ of the two paddles are moved back with respect to the blades $E_{11}$ and $E_{12}$ of the remaining two E paddles on the shaft so that the blades $E_{21}$ and $E_{22}$ of the third paddle from the right in Fig. 2 are, at their right hand edge portion, set back about ninety degrees with respect to the blades $E_{11}$ and $E_{12}$ of the first E paddle at their right hand edge portion, and similarly the blades $E_{21}$ and $E_{22}$ of the fourth paddle are, at their right hand edge portion, set back about ninety degrees with respect to the blades $E_{11}$ and $E_{12}$ of the second paddle at their right hand edge portion. Therefore, as to either of the pairs of blades $E_{21}$ and $E_{22}$, at a plane at right angles to the shaft *c* at any distance from the right hand edge of such blades, they are set back about ninety degrees with respect to the corresponding pair of blades $E_{11}$ and $E_{12}$ at a similar plane at the same distance from the right hand edge of such blades. Also, the blades of the four paddles on shaft *d* are all set at angles in their planes of rotation which would be the same if it were not for the preferred spiral arrangement of the blades. Because of this arrangement, as shown, the angles at which blades $F_{12}$ and $F_2$ are set, in their planes of rotation, continually advance, from right to left in Figure 2.

On the driving shaft *b*, driven in any convenient manner, as for example by belt drive to the fast and loose pulleys *h* and *i*, is mounted a spur wheel *k* that meshes with a larger spur wheel *m* on one end of the paddle shaft *d*. On the other end of the shaft *d* is mounted a spur wheel *n* that meshes with a larger spur wheel *o* mounted on the other paddle shaft *c*. The gear wheels *n* and *o* are, as shown, in the ratio of one to two, in size, so that the paddle shaft *d* rotates at twice the speed of the paddle shaft *c*.

Each paddle consists of a hub *p* with a pair of blades extending oppositely therefrom, in alinement with each other, that is, two blades one hundred and eighty degrees apart, with their center lines in the same plane; or it may consist of a longer hub with two or more blades axially separated from each other on each hub.

In the arrangement illustrated, the paddles and their respective blades are identified as follows. As shown in Fig. 2, there are four paddles on the shaft *d*. For convenience, they are considered in two groups. Their oppositely extending blades are identified as $F_{11}$ and $F_{12}$ for those on the right (Fig. 2) and $F_{21}$ and $F_{22}$ respectively for those on the left (Fig. 2).

There are four paddles on the shaft *c* which are adapted to coact with the four paddles on shaft *d*. They will be also considered in groups of two. Their respective oppositely extending blades are identified by the reference characters $E_{11}$ and $E_{12}$ as to those at the right (Fig. 2) and $E_{21}$ and $E_{22}$ for those at the left (Fig. 2).

Each paddle on one shaft co-operates with a similar paddle, alined therewith, on the other shaft, as is indicated above, such a pair of co-operating paddles comprising, in effect, an operating unit. For the most efficient operation a plurality of such units are employed. As shown in the drawings, four such paddles are mounted on shaft *d*, co-operating with similar paddles on shaft *c*.

The shafts *c* and *d* are spaced apart a suitable distance so that the outer edges of the blades on one shaft will wipe over the hubs of the alined paddles on the other shaft, in their respective revolutions, as shown. Also, the blades, for the most efficient operation, are of curved formation, each blade preferably having a concavely-curved forward face *q*, and a convexly-curved rear face, *r*, which is joined to the hub by the concavely curved fillet $r^1$.

The blades also are shown as inclined at an angle to the axes of the shafts, as shown, for a purpose of moving material to be treated lengthwise of the shafts during mixing. Also preferably, with the arrangement illustrated, the bottom of the casing *g* is provided with an inner contour having curvatures conforming substantially to the path of revolution of the tips of the blades but spaced slightly therefrom, as shown. The spacing of the shafts and the length of the blades enables the outer edges of the blades to sweep over the bottom and lower side surfaces of the interior of the casing. With this arrangement the concavely-curved forward face of each blade will carry material under treatment up, adjacent to the side of the casing, and over the top of its shaft, this material then being forced downwardly by the revolving blade in the space between the two shafts.

The blades of each paddle are set at such angles in their planes of rotation, in relation to the angular setting of the blades of the corresponding paddle on the other shaft, as to enable the said blades to coact in the mixing process without collision or interference. Considering a pair of coacting paddles and their blades $E_{11}$ and $F_{11}$, or $E_{22}$ and $F_{21}$, the blades coact in the course of their rotation in opposite directions. That is to say, as the blades of one shaft approach the blades of the other they provide opposed surfaces between which the material is pressed, and with the method of driving described the interengagement of the paddles ensures what may be termed a "push-and-pull" action on the material under treatment.

During one phase of the revolution the more rapidly moving blades $F_{11}$ and $F_{12}$ overtake the blades $E_{11}$ and $E_{12}$, that move at half the speed of the blades $F_{11}$ and $F_{12}$, and the material is therefore pushed or squeezed between the two sets of blades, and so is thoroughly kneaded and distributed throughout the mass. During the next phase of the revolution the blades $F_{11}$ and $F_{12}$ have passed the blades $E_{11}$ and $E_{12}$ and so exert a pulling action on the material, drawing it out or stretching it between those slow moving and the fast moving blades. This, in conjunction with the kneading action of the former phase, gives very effective results, more especially in the mixing of materials of a plastic nature. The above description applies equally to the action between all opposed, that is coacting, blades.

The operation, referred to generally above, will be made clearer by a more detailed description, with particular reference to the series of diagrams, Figs. 3–11, inclusive. In these diagrams relative successive positions are plotted of a pair of blades $E_{11}$ and $E_{12}$ on the slower shaft *c* coacting with a pair of blades $F_{11}$ and $F_{12}$ on the faster shaft *d*, it being understood that in the construction illustrated the shaft *d* makes one revolution while the shaft *c* makes one-half a revolution, and the blades $E_{11}$ and $E_{12}$ are the two blades of one paddle which coact with the two blades $F_{11}$ and $F_{12}$ of the opposed paddle, these blades all being shown in full lines in Figs. 3–11, inclusive. The blades shown in dotted lines on shaft *c* are the blades $E_{21}$, $E_{22}$ which coact with the blades $F_{21}$, $F_{22}$, on shaft *d*, as will be described later.

Figure 3:
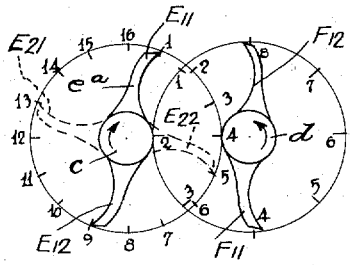
Figure 4:
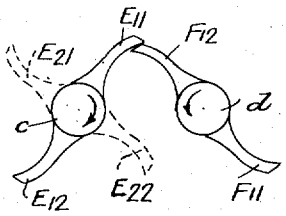
Figure 5:
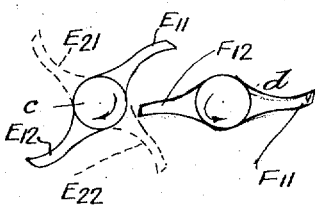
Figure 6:
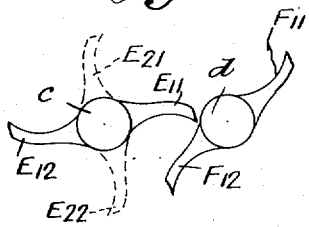

In the first position of the diagrams, as shown in Fig. 3, the blade $F_{12}$ is shown extending vertically upwards from the shaft *d*, while the blade $E_{11}$, extending upwardly from shaft *c*, inclines at a slight angle to the vertical, toward the blade $F_{12}$. Starting the movement of the parts from the said position, the blade $F_{12}$ moves downwardly, counter clockwise, and passes in front of blade $E_{11}$, which is moving down in the clockwise direction, at one-half of the speed of rotation of blade $F_{12}$. In the second position, as shown in Fig. 4 in the diagrams the outer edge of blade $F_{12}$, having advanced through forty-five degrees, is beginning to pass within and adjacent to the concave forward face of blade $E_{11}$, and in the third position, as shown in Fig. 5, the passage of the outer edge of blade $F_{12}$ over the concave face of blade $E_{11}$ has continued, with the effect of removing some material that may be adhering to this face.

With the continuance of the movement the faster blade, $F_{12}$, draws away from blade $E_{11}$, its outer edge swinging downwardly off the hubs of blades $E_{11}$ and $E_{12}$, both blades $F_{12}$ and $E_{11}$ moving downwardly at this time, in the space between the two shafts. During the separation of these blades, which occurs between the third and fourth positions, as shown respectively in the diagrams, Figs. 5 and 6, the material being treated will be drawn out between them.

Figure 7:
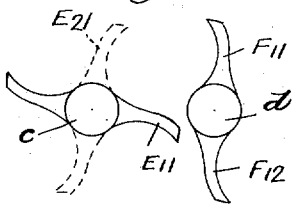
Figure 8:
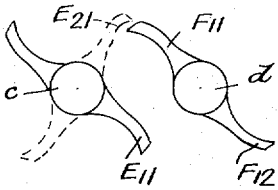

Continuing the movement, the outer edge of blade $E_{11}$ will wipe over or adjacent to the hubs of blades $F_{11}$ and $F_{12}$. This is the position shown in Fig. 6. The blade of $F_{11}$ now passes the upper vertical position in its counter-clockwise movement, as is indicated in the fifth position, as shown in Fig. 7, and approaches the back of blade $E_{11}$, these blades, as blade $F_{11}$ overtakes the slower blade $E_{11}$, assuming at one moment a position in which they are almost parallel, as is indicated in the sixth position, as shown in Fig. 8. The material will be pressed or squeezed between these blades, as blade $F_{11}$ approaches blade $E_{11}$.

Figure 9:
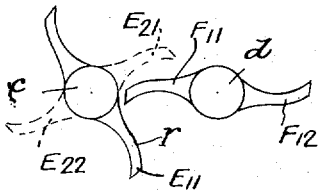
Figure 10:
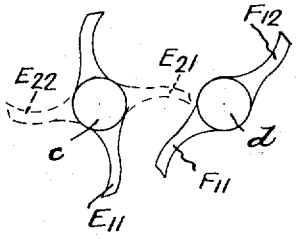
Figure 11:
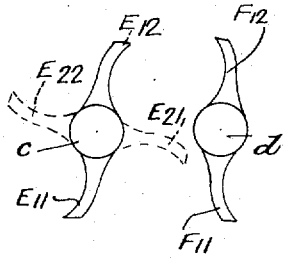

In the continued movement, the outer edge of blade $F_{11}$ passes closely adjacent to the hub of the coacting paddle as is shown in the seventh position, Fig. 9, and then adjacent to a portion of the convexly-curved surface $r$ of blade $E_{11}$, with the effect of removing therefrom some material that may be adhering thereto. The blades $F_{11}$ and $E_{11}$ now move away from each other, they being now adjacent to the bottom points of their rotations, as is indicated in the eighth and ninth positions, Figs. 10 and 11, respectively, and during this separation of the blades, the material will be drawn out between them. The blade $F_{12}$, in the ninth position, Fig. 11, has returned to the top, completing one revolution.

During the next revolution of blades $F_{11}$ and $F_{12}$, and half revolution of blades $E_{11}$ and $E_{12}$, the movements will be similar, the outer edge of blade $F_{12}$ passing within and adjacent to the curved front surface of blade $E_{12}$, with a subsequent drawing out of the material, after which blade $E_{12}$ passes close to the hub and adjacent to the back of blade $F_{12}$, and blade $F_{11}$ passes behind blade $E_{12}$, squeezing the material as blade $F_{11}$ overtakes blade $E_{12}$, blades $F_{11}$ and $F_{12}$ then separating and drawing out the material between them, thus completing what may be termed the cycle of operation of these two coacting paddles.

It will be noted that the movements described, which are inherent in the machine illustrated, are made possible only by correct angular setting of the blades on the two shafts, in relation to each other, the curved formation of the blades also being required to enable the full effects of the movements described to take place. With a different relative angular setting of the blades collision of the same in their rotations would occur.

Correct angular setting, for the speed ratio chosen for the two shafts, can be readily determined, by experiment or by the preparation of diagrams, but definition in terms of definite angular relationships is difficult. For example, in the case of the blades $F_{11}$ and $F_{12}$, and $E_{11}$ and $E_{12}$, whose movement was described in detail above, it will be found that when the blades of the fast paddle are vertical, the blades of the slower paddle are nearly, but not quite, vertical, this applying to the paddles as shown, with horizontal shafts and a speed ratio of two to one. The above may not be taken as a relationship true in all cases, however. As to the paddles $E_{21}$ and $F_{21}$, as will presently appear, when the blades of one paddle are vertical, the blades of the opposing paddle will be not quite horizontal.

The angular setting referred to will vary with a number of factors for different designs, such as the thickness of the blades, diameters of the hubs, etc. Thus when blade $F_{12}$ is vertical, blade $E_{11}$ may be about ten degrees away from vertical, or several degrees on either side of that figure. In practice, the angular setting and the curvatures of the front and rear surfaces of the blades may be determined, after deciding on the material and dimensions of the parts, by potting various positions of the fast blades and working out, on the drawing board, the angular relative setting of the slower blades and the curvatures of the blades which will enable, at the various positions, the described movements to take place.

The effect of the angular retardation of the pair of paddles having blades $E_{21}$ and $E_{22}$ with respect to the pair of paddles having blades $E_{11}$ and $E_{12}$ (or vice versa), is that different phases of the cycle, such as the squeezing or compression of the material, will occur alternately on the opposite sides of the machine.

The above will be made clear by further reference to Figs. 3–11, inclusive, in which various positions of the blades $E_{21}$ and $E_{22}$ are shown dotted. The two blades $E_{21}$ and $E_{22}$ coact with blades $F_{21}$ and $F_{22}$, as shown in Fig. 2. The blades $F_{21}$ and $F_{22}$ are not indicated by reference characters in Figs. 3–11, inclusive, for the sake of simplicity. Except for the preferred spiral arrangement of the blades, the blades marked $F_{21}$ and $F_{22}$ would be in axial alinement with blades $F_{11}$ and $F_{12}$ on the same shaft, and therefore could not be seen in the views Figs. 3–11. In the absence of the spiral arrangement, therefore, the blades $F_{22}$ and $F_{21}$ may be considered as represented by blades $F_{11}$ and $F_{12}$ in the diagrams of Figs. 3–11. In that case, as will be seen from the diagrams, the same cycle is followed between blades $E_{21}$ and $E_{22}$ and $F_{21}$, $F_{22}$ as between blades $E_{11}$, $E_{12}$, and $F_{11}$, $F_{12}$, but with different timing. Thus, for example, the squeezing of the material between the approximately parallel blades $E_{22}$ and $F_{21}$ indicated in Fig. 4 (in which blade $F_{21}$ is represented by $F_{12}$), is the same as the squeezing between blades $E_{11}$ and $F_{11}$ in the sixth position, Fig. 8, those positions shown in Figs. 4 and 8 being separated by one-half a revolution of the fast shaft.

When the spiral arrangement of the blades is used, as shown in Figs. 1 and 2, blades $F_{21}$, at different planes taken at right angles to their axis, will, of course, be more or less advanced in their planes of rotation with respect to corresponding elements of blades $F_{11}$ and $F_{12}$. The operation in this case will be explained in the following paragraph.

The feature of the invention as shown, which may be termed the spiral disposition of the blades on their respective shafts, will now be described. Preferably, as previously stated, each blade is so set on its shaft that its laterally extending elements are inclined at angles to the axes of the shafts. This is for the purpose of providing the blades with deflecting surfaces, for causing the material which is being mixed to move axially of the shafts, in addition to its rotating movement. This may be accomplished, as shown, by twisting each blade progressively from its base to its outer edge, in spiral or helical fashion, with the result that each blade will deflect or move the material in the axial direction as well as rotating it. The provision of some means for moving the material axially is highly desirable, since otherwise some types of material would tend to pack between the blades of coacting paddles, during compression of the material between such blades, probably causing damage.

In the arrangement shown in the drawings all of the blades of the paddles F on shaft *d* are given a spiral in the same direction, so as to form one continuous spiral. The blades of two of the paddles on shaft *c* form a continuous similar spiral, whereas the blades of the other two paddles form a continuous spiral which is the same as that of the first two with an interruption of about ninety degrees.

In the construction shown in the drawings, the spiral of the blades on shaft *c* recedes, while that of the blades on shaft *d* advances, reference being made to Fig. 2 and the fact that the shafts *c* and *d* turn toward each other in that view. With this construction, the full length of the edge of each blade will, or may, wipe closely adjacent to the hubs of the coacting paddle, cyclically. Also, wiping action of each blade against the front and rear surfaces of the blades of the coacting paddle will, or may, take place at the extreme right hand edge of each group of paddles, referring to Fig. 2 of the drawings.

What I claim is:

1. In a mixing machine, the combination of a container, parallel shafts therein, alined paddles on said shafts, each comprising a hub portion and a pair of radially extending diametrically opposed blades, means for rotating said shafts in opposite directions with the speed of rotation of one double that of the other, said shafts being suitably spaced and said blades being each of suitable length to cause their outer edges to pass closely adjacent to the hub portion of the opposite paddle, said blades each being curved, in its direction of rotation, and each paddle being so angularly set on its shaft in the plane of rotation as to enable the blades of the faster paddle periodically to overtake and pass adjacent to the blades of the slower paddle, without interference.

2. In a mixing machine, the combination of parallel shafts, a plurality of paddles on each shaft, the paddles of one shaft being alined with the paddles on the other shaft in pairs, for cooperation, each paddle comprising a pair of oppositely extending blades, means for rotating the opposed shafts in opposite directions with the speed of rotation of one double that of the other, said blades being of suitable lengths to pass closely adjacent to the axial portions of the opposed paddles, each paddle being so angularly set on its shaft in the plane of rotation in relation to the setting of the opposed paddle as to enable the blades of one paddle of each pair to overtake and pass adjacent to blades of the other paddle of the pair, recurrently, without interference, and the blades of paddles axially separated along one shaft being set at different angles from each other in their respective parallel planes of rotation.

3. In a mixing machine, the combination of parallel shafts, alined paddles on said shafts, each comprising a pair of oppositely extending blades, and means for rotating said shafts in opposite directions with the speed of rotation of one double that of the other, said blades being each of suitable length to pass closely adjacent to the axial portions of the opposed paddle, each paddle being so angularly set in the plane of its rotation in relation to the setting of the opposed paddle as to enable the blades of one paddle to overtake and pass adjacent to blades of the opposed paddle, recurrently, without interference, and said blades being inclined at angles to the axes of said shafts.

4. In a mixing machine, the combination of parallel shafts, a plurality of paddles on each shaft, the paddles of one shaft being alined with the paddles on the other shaft in pairs, for cooperation, each paddle comprising a pair of oppositely extending blades, and means for rotating the shafts in opposite directions with the speed of rotation of one double that of the other, said blades being of suitable lengths to pass closely adjacent to the axial portions of the opposed paddles, each paddle being so angularly set in the plane of its rotation in relation to the setting of the opposed paddle as to enable the blades of one paddle of each pair to overtake and pass adjacent to blades of the other paddle of the pair, recurrently, without interference, and said blades being laterally spirally curved, the center line of each spiral being the axial line of the shaft.

5. In a mixing machine, the combination of a pair of shafts, paddles thereon alined for cooperation, each comprising a hub and a pair of blades extending radially therefrom, and means for rotating said shafts in opposite directions with the rate of rotation of one double that of the other, said blades being of suitable length to cause their outer edges to pass closely adjacent to the hub portions of the opposed paddles, and the blades of the more slowly moving paddle being provided with concavely-curved surfaces adjacent to which the outer edges of the more rapidly moving paddle may pass, recurrently.

6. In a mixing machine, the combination of parallel shafts, paddles thereon alined for cooperation, each comprising a pair of diametrically opposed blades extending radially therefrom positioned to rotate in substantial alinement with the blades of the paddle on the other shaft, and to intersect deeply the circle described by the outer edges of the blades of said other paddle, and means for rotating said shafts in opposite directions with the rate of rotation of one double that of the other, said blades being concavely and convexly curved on their forward and rear faces respectively in their directions of rotation and each paddle being angularly so set on its shaft in the plane of rotation in relation to the setting of the opposing paddle as to enable blades of the faster paddle periodically to overtake blades of the slower paddle, approach closely thereto, and then swing away therefrom, without interference.

7. In a mixing machine, the combination of parallel shafts, paddles thereon alined for cooperation, each comprising a pair of diametrically opposed blades extending radially therefrom positioned to rotate in substantial alinement with the blades of the paddle on the other shaft, and to intersect deeply the circle described by the outer edges of the blades of said other paddle, and means for rotating said shafts in opposite directions with the rate of rotation of one double that of the other, said blades being concavely and convexly curved on their forward and rear faces respectively in their directions of rotation and each paddle being angularly so set on its shaft in the plane of rotation in relation to the setting of the opposing paddle as to enable blades of the opposing paddles periodically to approach each other closely and then swing away from each other without interference, with one blade of the faster paddle passing in front of one blade of the slower paddle and thereafter the other blade of the faster paddle passing behind the same blade of the slower paddle in the course of each revolution of the faster paddle.

FRITZ BEKEN.